US011233632B1

(12) United States Patent
Giuliano et al.

(10) Patent No.: US 11,233,632 B1
(45) Date of Patent: Jan. 25, 2022

(54) CONNECTED SECURE KEY REDISTRIBUTION SYSTEM AND METHOD

(71) Applicant: Cal-Chip Electronics Specialty Products, Inc., Warminster, PA (US)

(72) Inventors: Jason Michael Giuliano, Furlong, PA (US); Thomas Scott Rancour, II, Stanwood, MI (US)

(73) Assignee: Cal-Chip Electronics Specialty Products, Inc.

( * ) Notice: Subject to any disclaimer, the term of this patent is extended or adjusted under 35 U.S.C. 154(b) by 0 days.

(21) Appl. No.: 17/366,560

(22) Filed: Jul. 2, 2021

Related U.S. Application Data

(60) Provisional application No. 63/047,381, filed on Jul. 2, 2020.

(51) Int. Cl.
*H04L 9/08* (2006.01)
*H04L 9/32* (2006.01)

(52) U.S. Cl.
CPC .......... *H04L 9/0825* (2013.01); *H04L 9/0894* (2013.01); *H04L 9/3236* (2013.01)

(58) Field of Classification Search
CPC .... H04L 9/0825; H04L 9/3236; H04L 9/0894
See application file for complete search history.

(56) References Cited

U.S. PATENT DOCUMENTS 5,913,210 A 6/1999 Call
7,181,620 B1 2/2007 Hur
7,894,606 B2 2/2011 Eastham
8,761,401 B2 6/2014 Sprunk et al.
9,479,328 B1 10/2016 Wilburn et al.
(Continued)

FOREIGN PATENT DOCUMENTS

CN 107919962 A 4/2018
CN 110113164 A 8/2019
(Continued)

OTHER PUBLICATIONS

Han et al., An Enhanced Key Management Scheme for LoRaWAN, An Enhanced Key Management Scheme for LoRaWAN, Cryptography 2018, 2, 34; doi:10.3390/cryptography2040034, pp. 1-12.
(Continued)

*Primary Examiner* — J. Brant Murphy
(74) *Attorney, Agent, or Firm* — The Belles Group, P.C.

(57) ABSTRACT

In one embodiment, a method for securely distributing secret keys for hardware devices is disclosed. A distributor server transmits to a provider server an order for hardware devices. Each hardware device has a unique identifier and at least one secret key for authentication. The provider server sends a database associated with the distributor, for each of the hardware devices, the unique identifier and an unencrypted version of the at least one secret key. In response to an order received by the distributor from a customer for a portion of the hardware devices, the distributor server provides the database the unique identifiers and an associated customer order identifier, and the distributor server provides a customer server the unique identifiers. In response to the customer logging into the database and providing the order information, the database provides the customer the unencrypted keys for the hardware devices to allow authentication.

20 Claims, 9 Drawing Sheets

(56) References Cited

U.S. PATENT DOCUMENTS

| | | | |
|---|---|---|---|
| 9,998,925 | B2 | 6/2018 | Yang et al. |
| 10,237,063 | B2 | 3/2019 | Brands |
| 10,277,587 | B2 | 4/2019 | Li et al. |
| 10,326,797 | B1 | 6/2019 | Murray et al. |
| 10,341,329 | B2 | 7/2019 | Brands |
| 10,362,037 | B2 | 7/2019 | Zou et al. |
| 10,425,242 | B2 | 9/2019 | Berdy et al. |
| 10,642,969 | B2 | 5/2020 | James et al. |
| 2003/0009395 | A1 | 1/2003 | Yu et al. |
| 2015/0326567 | A1* | 11/2015 | Hamburg ............... H04L 67/32 713/155 |
| 2017/0200225 | A1* | 7/2017 | Kanungo ............... G06Q 40/04 |
| 2018/0351948 | A1 | 12/2018 | De Jong et al. |
| 2019/0173669 | A1 | 6/2019 | Bringer et al. |
| 2019/0306227 | A1 | 10/2019 | Nuggehalli et al. |
| 2019/0356482 | A1* | 11/2019 | Nix ........................... H04L 9/14 |
| 2020/0021447 | A1 | 1/2020 | Ih et al. |
| 2020/0067708 | A1* | 2/2020 | Subba ................... H04L 9/0841 |
| 2020/0169460 | A1 | 5/2020 | Bartlett et al. |

FOREIGN PATENT DOCUMENTS

| | | |
|---|---|---|
| CN | 110363017 A | 10/2019 |
| EP | 0948158 A2 | 10/1999 |
| EP | 3306970 A1 | 4/2018 |
| GB | 2570292 A | 7/2019 |
| KR | 10-0649858 B1 | 11/2006 |
| KR | 10-1686167 B1 | 12/2016 |
| WO | WO00/67145 | 11/2000 |
| WO | WO2018/126029 A2 | 7/2018 |
| WO | WO2019/147311 A1 | 8/2019 |

OTHER PUBLICATIONS

Tschofenig, Hannes et al., Credential Management For Internet of Things Devices, Internet Protocol for Smart Objects (IPSO) Alliance, Dec. 2017, https://www.omaspecworks.org/wp-content/uploads/2018/03/IPSO-IoT-Credential-Management_Final.pdf, retrieved Jun. 28, 2021, pp. 1-17.

Adeunis, Configuration of Your Sensors, https://www.adeunis.com/en/device-management-2/sensor-setup/, retrieved Jun. 28, 2021, pp. 1-4.

Radio Bridge, Multitech Acquires Radio Bridge, Monitoring Solutions Complete Sensor-to-Cloud Monitoring Solutions, Wireless Sensor Products and Radio Bridges Using LoRaWAN Technology, https://radiobridge.com/?gclid=EAIaIQobChMI2JnVrfHp6QIVFaSzCh2P5ARmEAAYASAAEgKwnPD_BwE, retrieved Jun. 28, 2021, pp. 1-3.

Adeunis Help Desk, Where Can I Find The Activation Keys For The Sensor Declaration?, Mar. 2, 2021, https://adeunis.freshdesk.com/en/support/solutions/articles/22000253269-where-can-i-find-the-activation-keys-for-the-sensor-declaration-retrieved Jun. 28, 2021, pp. 1-3.

SEMTECH LoRa | CLOUD, LoRa Cloud Portal, LoRa Cloud Geolocation, 2020, https://www.loracloud.com/?logout=true, retrieved Jun. 28, 2021, pp. 1-2.

PCT International Search Report PCT/US21/40242 dated Oct. 5, 2021.

* cited by examiner

CONNECTED SECURE KEY REDISTRIBUTION SYSTEM AND METHOD

CROSS REFERENCE TO RELATED APPLICATIONS

The present application claims the benefit of U.S. Provisional Patent Application No. 63/047,381, filed Jul. 2, 2020, which is incorporated herein by reference in its entirety.

BACKGROUND

Broadly used machine-to-machine (M2M), sensor network, and internet of things (IoT) systems implement some form of symmetric and/or asymmetric encryption, hashing functions, message authentication codes (MACs), and/or digital signatures safeguarding connected devices and networks. For low cost and low power M2M and sensor networks that use hardware devices with embedded MCUs/MPUs with limited computational power and memory, compromises have been made in the complexity of security protocols used to authenticate devices joining the network and securing the data transmitted. Examples of these protocols include ZigBee, Bluetooth, LoRaWAN, SigFox, and Zwave. Many of these protocols have decided to use symmetric encryption as the primary authentication and security method due to the benefits of symmetric encryption algorithms in terms of implementation on memory, power, and computationally-constrained MCUs and MPUs.

The exact protocol implementation and cryptography varies between industry standards, but all rely on maintaining the integrity of shared secret key (SK). There is extensive public documentation around the exact implementations of pre-shared secret key symmetric encryption.

In some cases, like LoRaWAN ABP mode, the hardware device directly encrypts data transmitted on the network with its secret key(s) stored in local memory. In other cases, like LoRaWAN OTAA mode, the hardware device uses a secret key stored in local memory to initiate a "join" process with the network where this secret key is used only to authenticate the join process and subsequently a set of dynamically created "session keys" are instantiated per the network protocol and used for subsequent communication. In all cases, there is a need to use a secret key(s) stored in the hardware device prior to joining the network as a critical part of the process of authenticating the hardware device on the network and enabling subsequent communication.

The current standards-based network protocols using secret key symmetric encryption define at least two network elements. The first network element is hardware devices. These are end-points (sensors, actuators, HMI devices, etc.) that join and send data on the network. The second network element is the network root of trust entity. This is the entity that authenticates hardware devices attempting to join a network and optionally negotiates a protocol-specific security policy. The exact terminology for this entity varies across industry standards. Examples includes Zigbee (Trust center, Zigbee router or coordinator), LoRaWAN (Join server), and Zwave (controller). The hardware devices may communicate directly with the network root of trust in star network typologies, or have their communications relayed or forwarded through other hardware devices (hop) in mesh network typologies.

One of the ongoing challenges with the current secret key symmetric encryption-based network protocols is the need to securely register the initial secret keys in both the network trust entity and the hardware device before the device can attempt to join the network. If the secrecy of this key is compromised then significant security vulnerabilities are exposed to the entire network.

In a completely vertically integrated solution scenario where one company designs, manufactures, and deploys all network elements, it would be fairly straightforward to maintain the secrecy and integrity of the secret key. The real world ecosystem and marketplace, however, is composed of multiple solution component providers and creates a need for the secure distribution of these secret keys through the multi-tiered hardware device supply chain and network deployment. Existing industry standards define how hardware devices can be registered and authenticated on these networks, but none of the standards define a process and methodology for how the pre-provisioned secret keys seeded into hardware devices memory are securely distributed through a multi-tiered hardware device supply chain and complex marketplace including hardware device OEMs/CMs, distributors/resellers, hardware device owners, network operators, owners of the data generated by hardware devices, and lessors of hardware devices.

Supply chain participants may include the following:

Original Equipment Manufacturers (OEMs). OEMs manufacture hardware devices such as sensors, actuators, and gateways that rely on a security/authentication method based on a pre-shared "secret" key programmed into the memory of the device. These OEMs generally do not know which customer will buy which device at the time of manufacture. Note that a contract manufacturer (CM) may act on behalf of the OEM and may be the entity that programs the secret keys into the hardware device. As used herein, the term "manufacturer" or "provider" may include an OEM and/or a CM or any other provider of hardware devices.

Distributor, reseller. In typical markets, OEMs do not sell directly to customers, but to distributors or resellers. The distributor will stock the physical hardware from the OEMs and sell it to the end customer. For the customer to make use of the product they must have access to the pre-programmed secret key. As used herein, the term "distributor" may include any entity that buys and sells hardware devices, including resellers.

Customers. The customer is typically the end user of the sensors, actuators, and/or gateways who needs access to the secret key to actually use the devices. It is noted that the term "customer" is not limited to end users. For example, a customer may buy hardware devices to lease them to an end user.

Network provider (optional). The network provider is the company managing the network. For the customer's devices to join this network, the secret key must be registered with the network provider's root of trust. The term "customer representative network" may include any type of network, provided by the network provider, which may be accessed by a representative of the customer for authenticating hardware devices.

Lease or finance company (optional). In some cases, the IoT products or other devices will be lease or financed. Ideally, the lessor would maintain ownership of the secret key, but would register the device with the network on behalf of the lessee.

Due to the lack of secret key distribution innovations in the marketplace, some industry standard protocols have defined a "pairing" process where the hardware device and network root of trust both enter a less secure "pairing" mode to allow the initial authentication of the hardware device on the network. In some cases all devices use the same secret keys during the initial pairing handshake. Although allowed, this method is increasingly discouraged due to potential security vulnerabilities during the pairing process. Further, "pairing" is a manual process that requires a person to initiate the "pairing" mode on the device. For some use cases like pairing a single temperature sensor to a person's phone, the "manual" overhead of pairing is not an issue. For IoT applications that need to deploy hundreds of thousands of sensors, however, the labor cost and time of this method is prohibitive. Further the person performing the manual pairing still must be trusted to some level. Although the root secrete keys of the device are not exposed during the manual pairing process, in most cases there is nothing preventing the unpaired device from simply being provisioned to another network, in effect being stolen.

More recent updates to industry standards (example Zigbee 3.0) improve the security during pairing by requiring some type of "out of band" methodology to exchange the secret key during the initial pairing process, for example, using a cellphone with a camera to capture a QR code on the device and using the phone's "out of band" IP connection with the network root of trust to register the secret key. Although more secure than prior pairing processes, this is still a manual process and will not scale to high-volume sensor deployments due to the labor costs and security issues outlined above.

Still another marketplace workaround for the lack of a secret key distribution method is the addition of a physical hardware secure element (HSE) chip (ICs) to the hardware sensor design. Although this approach technically provides an "out of band" process for hardware device owners to extract secret keys from devices, it adds the additional cost of the ICs to the hardware endpoints. Further to extract the secret keys, the end customer must implement a software process with the IC manufactures "porthole" to actually extract the secret keys per each IC. This incurs both NRE and subscription costs. In actuality, most hardware devices (e.g., sensors, actuators) do not use HSE ICs and simply have the secret key directly programmed into the non-volatile memory of the hardware device by the hardware device OEM/CM.

In actuality, the most common methods being used in the marketplace to provide the pre-programmed secret keys within hardware devices to their purchaser (end customer) is the sensor OEM publishing them in clear text and delivering them to customers via emails, spreadsheets, flat files (CSV, etc.), or printed on labels included with hardware devices. This clear text exposure of hardware device secret keys as they move through the supply chain completely undermines the security foundation of the secret key symmetric encryption-based industry standard network protocols like LoRaWAN, Zigbee, and others.

Direct Sale (FIG. 1)

FIG. 1 is a block diagram of a system 11 in which a direct sale is made from the OEM (provider) 104 to the customer 106, the OEM 104 providing the secret keys 114 to the customer. According to this embodiment, a silicon manufacturer 102 manufactures un-provisioned ICs (e.g., hardware devices) 116 and provides them to the OEM in operation 122. The OEM 104 has a database 110 that includes a device unique identifier (DUID) 112 and at least one secret key 114 for each hardware device. This data 112, 114 is provided to the un-provisioned device 116 to cause device 118.

In operation 124, the unique identifiers and secret keys are sent to the customer server 107 of the customer 106. This data 112, 114 is typically sent via CVS file, email, etc.

The customer 106 then buys, receives, and deploys the hardware device (operation 126). In operation 128, the customer registers the unique identifiers and keys by sending them to the network authority 108 for device authentication, the network authority storing the unique identifiers 112 and secret keys 114 in a database 109. The authenticated device 120 joins the network using the unique identifier and secret key(s). Such direct sales from OEMs to end customers are limited in the real-world supply chain to a limited set of large enterprises driving high volume products.

Distributor Providing Keys (FIG. 2)

The current situation also creates a logistics problem when OEMs use distributors/resellers. In the real marketplace, OEMs manufacture hardware devices in large batches and inject unique secret keys at the time of manufacture. In most cases, the OEM does not know who will purchase a particular hardware device at the time of manufacture, and in most cases the end customer actually purchases the device from a distributor/reseller and not directly from the hardware OEM. Hardware devices are manufactured with both a public serial number(s), device unique identifiers (DUIDs), and secret keys. The public serial numbers (or MAC address/EUIs/UUID) are stored in internal non-volatile memory and typically printed in clear text on the device. The secret keys are stored in protected internal non-volatile memory of the hardware device and to maintain integrity should never be printed or shared in clear text. In many cases, hardware devices have multiple secret keys. Only the end customer should have clear-text access to the secret keys and/or securely control the process of registering the secret keys with the network root of trust.

FIG. 2 is a block diagram of a system 12 in which devices 118 are sold through a distributor 130, the distributor providing the customer the secret keys 114 either with the devices or in a spreadsheet. The components and operations are similar to those of FIG. 1, but for the role of the distributor 130. Here, the OEM sends the unique identifiers to the distributor (operation 125), and the distributor 130 in turn sends the unique identifiers to the customer 106 (operation 127).

Each of these operations 125, 127 creates a security risk. The distributor/reseller 130 must somehow connect the customer 106 to the secret keys of the devices they purchased. Today, the OEMs are including a printed secret key (or manifest of secret keys) with the shipment of products. Alternatively, they are emailing a excel spreadsheet or CVS file with the keys to distributors and/or customers.

Distributors/resellers must provide end customers buying hardware devices with the specific secret keys for each device purchased. Logistically, they must track the unique serial number of each device and its secret keys. At the time of purchase, the distributor must somehow securely deliver these secret keys to the end customers. To ensure security, the distributor/reseller should not have unprotected access to the clear-text secret keys of the devices they sell. To maintain integrity, the distributor/reseller must provide a method to cache (temporally store) and/or transfer secret keys with protected methods and processes to the end customer or enable the customer to directly control the secure delivery of the secret keys of hardware devices purchased to the network root of trust the customer selects.

BRIEF SUMMARY

The present disclosure may be directed, in one aspect, to a method or system for securely distributing secret keys for hardware devices. In one aspect, a method includes a) a distributor server of a distributor transmitting to a provider server of a provider an order for hardware devices, wherein the provider is separate and distinct from the distributor, each hardware device has a unique identifier and at least one secret key, and the at least one secret key enables authentication of the hardware device; b) receiving from the provider server at a database associated with the distributor, for each of the hardware devices, the unique identifier and an unencrypted version of the at least one secret key (the unique identifiers and the unencrypted keys), the distributor not having general access to the unencrypted keys; c) in response to an order received by the distributor from a customer for a portion of the hardware devices: i) the distributor server providing the database (1) the unique identifiers for the hardware devices of the ordered portion, and (2) an associated customer order identifier for the order; and ii) the distributor server providing a customer server the unique identifiers for the hardware devices of the ordered portion; d) in response to a representative of the customer logging into the database from a customer representative network and providing, via a user interface, order information for the ordered portion of the hardware devices, the database providing the customer server or the customer representative network the unencrypted keys for the hardware devices of the ordered portion; and e) authenticating the hardware devices of the ordered portion using the unencrypted keys for the hardware devices of the ordered portion.

In another aspect, a system includes a provider server of a provider; a distributor server of a distributor, the distributor server configured to transmit to the provider server an order for hardware devices, wherein the provider is separate and distinct from the distributor, each hardware device has a unique identifier and at least one secret key, and the at least one secret key enables authentication of the hardware device; and a database associated with the distributor, the database configured to receive from the provider server, for each of the hardware devices, the unique identifier and an unencrypted version of the at least one secret key for each of the hardware devices (the unique identifiers and the unencrypted keys), the distributor not having general access to the unencrypted keys; wherein the distributor server is further configured to, in response to an order received by the distributor from a customer for a portion of the hardware devices: provide the database (1) the unique identifiers for the hardware devices that of the ordered portion, and (2) an associated customer order identifier for the order; and provide a customer server the unique identifiers for the hardware devices of the ordered portion; wherein in response to a representative of the customer logging into the database from a customer representative network and providing, via a user interface, order information for the ordered portion of the hardware devices, the database is configured to provide the customer server or the customer representative network the unencrypted keys for the hardware devices of the ordered portion; and wherein the customer representative network is configured to authenticate the hardware devices of the ordered portion using the unencrypted keys for the hardware devices.

In yet another aspect, a method includes a) a distributor server of a distributor transmitting to a provider server of a provider an order for hardware devices, wherein the provider is separate and distinct from the distributor, each hardware device has a unique identifier and at least one secret key, and the at least one secret key enables authentication of the hardware device; b) receiving from the provider server at a database associated with the distributor, for each of the hardware devices, the unique identifier and an unencrypted version of the at least one secret key (the unique identifiers and the unencrypted keys), the distributor not having general access to the unencrypted keys; c) in response to an order received by the distributor from a customer for a portion of the hardware devices: i) the distributor server providing the database (1) the unique identifiers for the hardware devices of the ordered portion, and (2) an associated customer order identifier for the order; and ii) the distributor server providing a customer server the unique identifiers for the hardware devices of the ordered portion; and d) in response to a representative of the customer logging into the database from a customer representative network and providing, via a user interface, order information for the ordered portion of the hardware devices, the database providing the customer server or the customer representative network the unencrypted keys for the hardware devices of the ordered portion to enable the customer representative network to authenticate the hardware devices of the ordered portion.

BRIEF DESCRIPTION OF THE DRAWINGS

The present disclosure will become more fully understood from the detailed description and the accompanying drawings, wherein.

Figure 1:
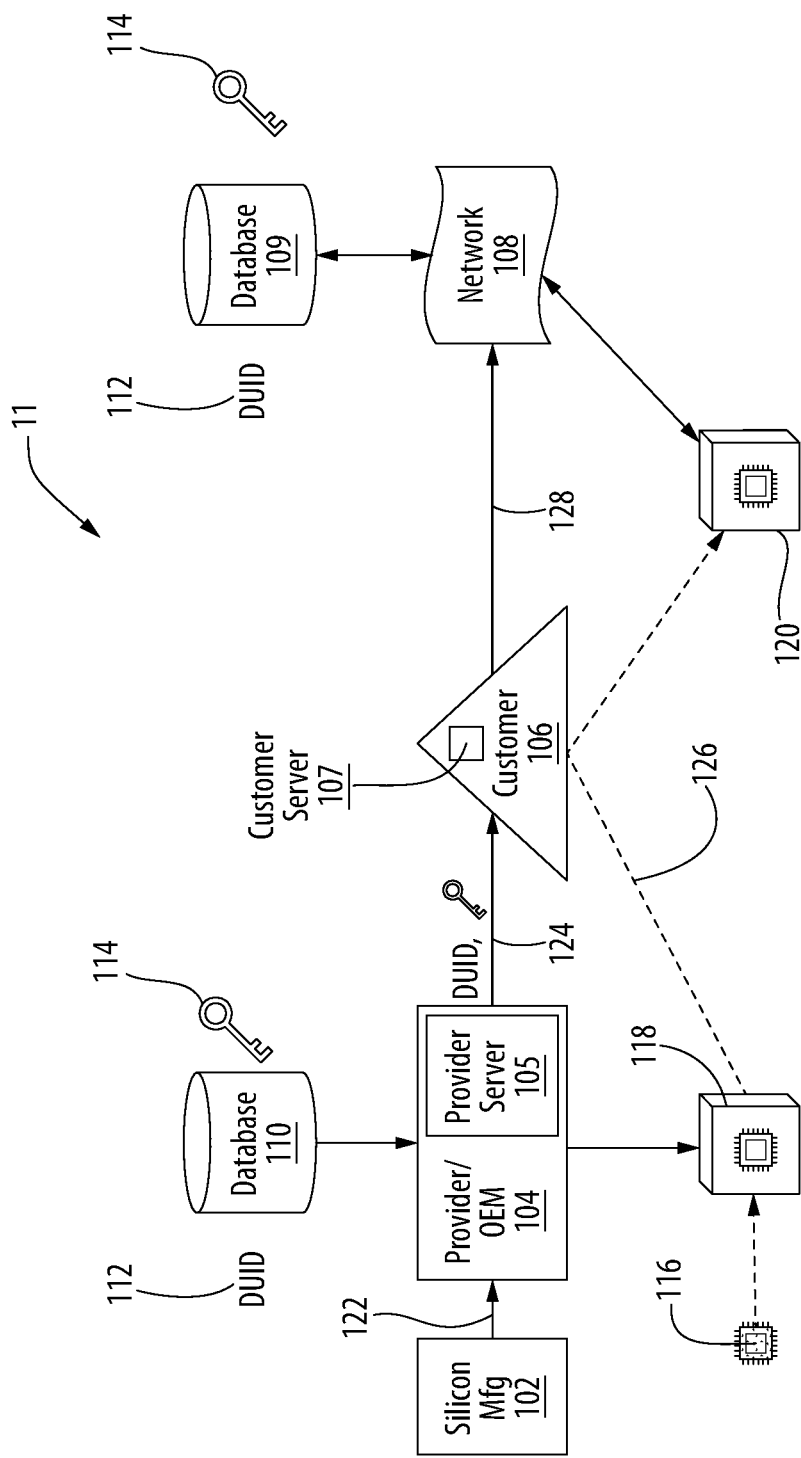
FIG. 1 is a block diagram of a prior art system in which a direct sale is made from the manufacturer to the customer, the manufacturer providing the secret keys to the customer.
Figure 2:
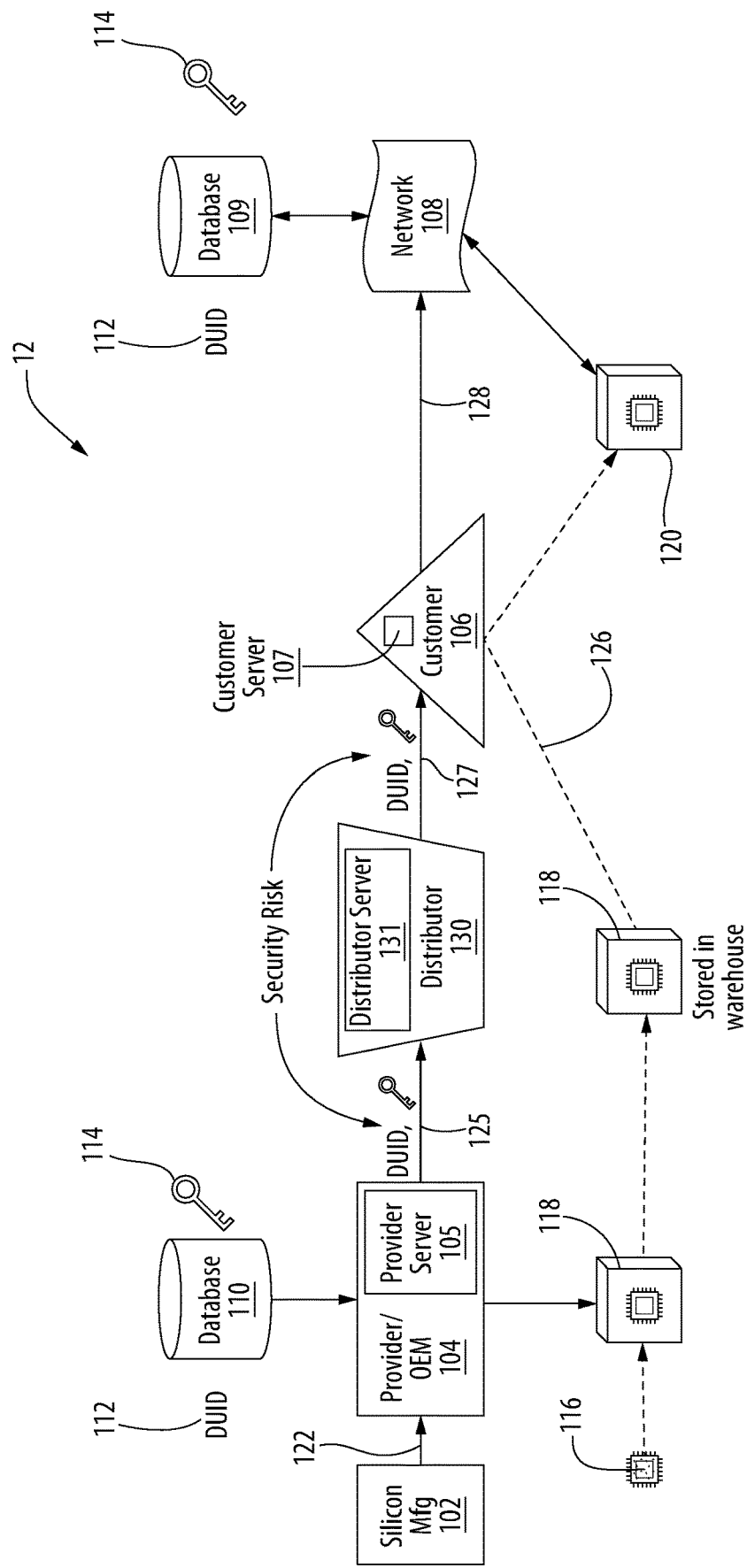
FIG. 2 is a block diagram of a prior art system in which devices are sold through a distributor, the distributor providing the customer the secret keys either with the devices or in a spreadsheet.

The drawings represent one or more embodiments of the present invention(s).

DETAILED DESCRIPTION

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

In the following description, where block diagrams or circuits are shown and described, one of skill in the art will recognize that, for the sake of clarity, not all peripheral components or circuits are shown in the figures or described in the description. For example, common components such as memory devices and power sources may not be discussed herein, as their role would be easily understood by those of ordinary skill in the art. Further, the terms "couple" and "operably couple" can refer to a direct or indirect coupling of two components of a circuit.

It is noted that for the sake of clarity and convenience in describing similar components or features, the same or similar reference numbers may be used herein across different embodiments or figures. This is not to imply that the components or features identified by a particular reference number are identical across each embodiment or figure, but only to suggest that the components or features are similar in general function or identity.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

The following discloses methods and systems for secure distribution of pre-provisioned secret keys in hardware devices required for many M2M (machine to machine), sensor network, and IoT systems based on pre-shared secret key symmetric encryption (AES, DES, IDEA, Rcx, Blowfish) protocols to the final device owner, user, or lessor through a multi-tiered hardware device supply chain including hardware device OEMs (providers), distributors/resellers, hardware device owners, network operators, owners of the data generated by hardware devices, and lessors of hardware devices.

Figure 3:
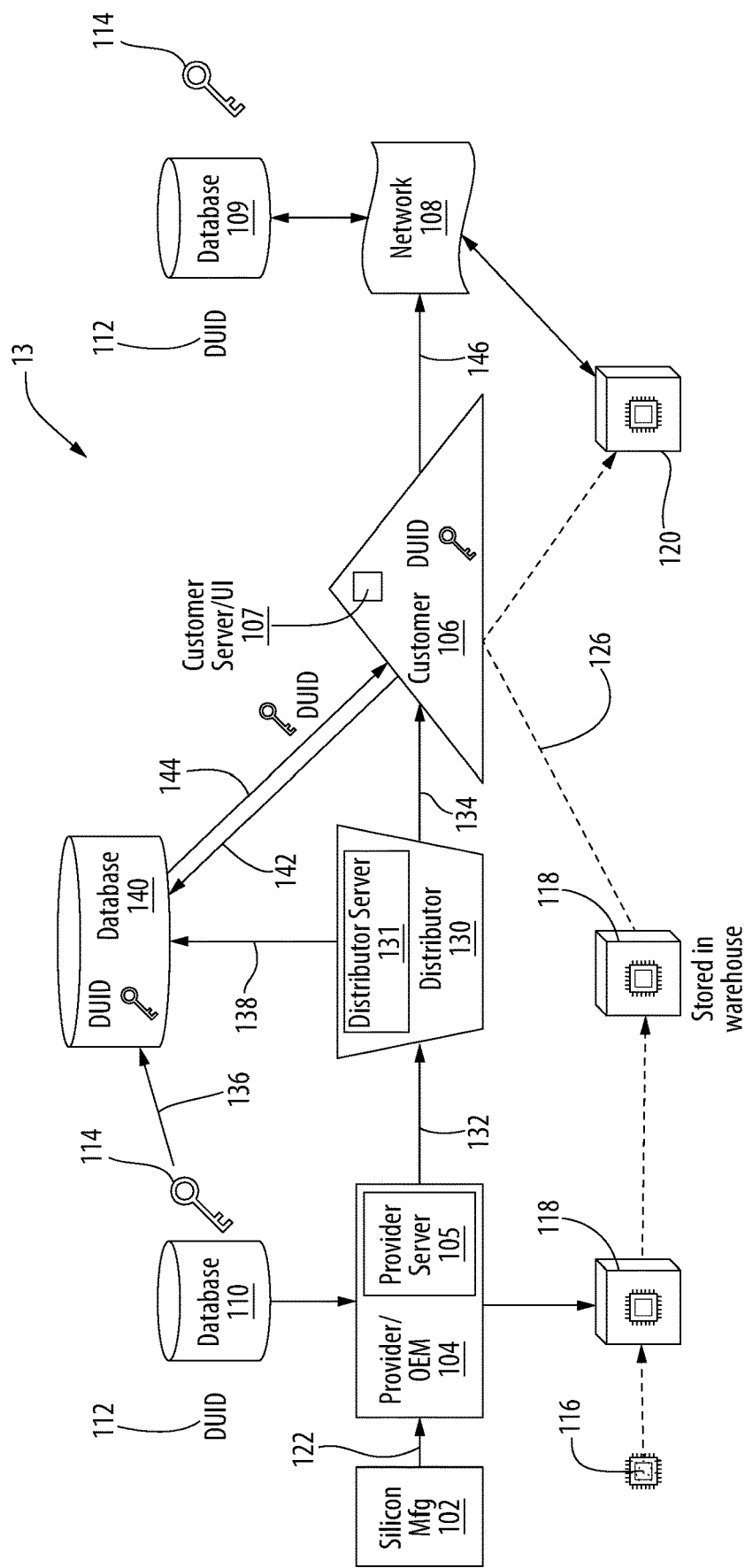
FIG. 3 is a block diagram of a system in which devices are sold through a distributor and the devices' secret keys are provided to the customer using a database associated with the distributor.

Database Providing Keys (FIG. 3)

FIG. 3 is a block diagram of a system 13 in which devices 118 are sold through a distributor 130 and the devices' 118 secret keys are provided to the customer using a database 140 associated with the distributor 130, but to which the distributor has limited access. The database 140 is critical to enabling a more secure distribution of secret keys.

In the exemplified embodiment, the silicon manufacturer 102 provides the un-provisioned IC/hardware 116 to the provider 104 (in this embodiment an OEM, though the invention is not so limited) (operation 122). The OEM 104 has a database 110 that includes a device unique identifier (DUID) 112 and at least one secret key 114 for each hardware device. This data 112, 114 is provided to the un-provisioned device 116 to cause device 118. The at least one secret key 114 enables authentication of the hardware device.

In operation 132, rather than sending both the identifiers 112 and secret keys 114 to the distributor 130 in cleartext (un-encrypted) form, the OEM 104 only sends the identifiers 112 to the distributor 130. In operation 136, the OEM server 105 securely uploads both the unique identifiers 112 and the unencrypted secret keys 114 to the new database 140, which may be associated with the distributor 130. The data for the device may comprise a unique identifier and an unencrypted version of the at least one secret key for each of the hardware devices. Further, while the database 140 may be associated with the distributor, it may be configured such that the distributor does not have general access to the unencrypted secret keys forming part of the device data. By not having "general access," only one or two administrators of the distributor have access to the unencrypted secret keys (e.g., cleartext access to the keys. The other representatives of the distributor only have access to the encrypted secret keys. The identifiers and secret keys are preferably uploaded using a TLS-protected IP connection.

The distributor server 131 transmits to the provider server 105 orders for hardware devices, the distributor and provider being separate and distinct entities. The distributor 130 in turn receives orders from customers to purchase some portion of the hardware devices 118 stored by distributor 130. In operation 138, in response to the customer order, the distributor server 131 provides the database 140 (1) the unique identifiers for the hardware devices that form part of the customer-ordered portion, and (2) an associated customer order identifier for the order. The customer order identifier may be, for example, a customer order number, a hash function, or some other means for identifying the customer order. In further response to the customer order, in operation 134, the distributor server sends a customer server 107 of the customer 106 the unique identifier for each of the hardware devices of the ordered portion. The unique identifiers may be sent in cleartext.

In the exemplified embodiment, a representative of the customer logs into the database 140 from a customer representative network and provides, via a user interface 107, order information for the ordered portion of the hardware devices (operation 142). This order information may be, for example, one or more of each unique identifier for the hardware devices of the ordered portion, the customer order identifier, and/or a Hash, or some other information about the customer order.

In response to the customer representative logging in and providing the order information, the database 140 provides the customer server 107 (or in other embodiments the customer representative network 108) unencrypted versions of the at least one secret key (e.g., in cleartext) for each of the hardware devices of the ordered portion (operation 144) to enable the customer representative network to authenticate the hardware devices of the ordered portion. In the exemplified embodiment, the customer server then registers the unique identifiers and secret keys (e.g., via CVS or email) with the customer representative network 108 (operation 146). The exemplified network 108 has a database 109 for storing the unique identifiers 112 and secret keys 114. The devices join the network 108 using the unique identifiers 112 and secret keys 114 and become authenticated devices 120.

It is noted that, for the sake of simplicity, FIG. 3 and other figures refer to a single distributor server, provider server, and customer server. But in practice, each of these servers may comprise multiple processors in different locations.

Further, while the above invention has been described as a method, it may instead be a system comprising the components discussed above.

The embodiment of FIG. 3 enables distributors/resellers to securely transfer the secure keys injected by the OEM into devices to a customer who purchases a specific device through the distributer/reseller. The distributor/reseller provides a secure electronic system as a service to enable OEMs to directly upload and temporarily store the secure keys for all of the devices they sell through said distributor in a method where the secret keys are protected and not generally available in cleartext to the distributors' employees processing orders. Further measures to protect the secret keys may include restricting access to the database 140 storing the secret keys via user account, secondary encryption of the secret keys including the option for the customer to provide their own public key to the distributor/reseller, and/or the generation cryptographically secure unique claim UUID (cUUID) that can be used to retrieve the secret key for a specific device. Methods can be used independently or in any combination to increase security. Customers who buy devices from the distributor will be provided a method to securely "claim" the secret keys for the specific hardware devices they purchase from the distributor via the secure electronic system. This process greatly improves the security of all devices and networks as the pre-provisioned secret key(s) stored in hardware devices is only exposed in cleartext to the actual end customer purchasing the hardware device. The secure electronic system allows the OEM to manufacture devices in advance and stock the distributor without knowing who the actual end customer will be. The customer can then use the hardware device secret keys to register the devices with either their network root of trust or with a network provider's root of trust.

Note that while the disclosed embodiment shows only a single distributor 130, the system 13 may include multiple distinct distributors each communicating with the same database 140 or with different databases, but otherwise carrying out the similar operations for providing secure authentication.

Figure 4:
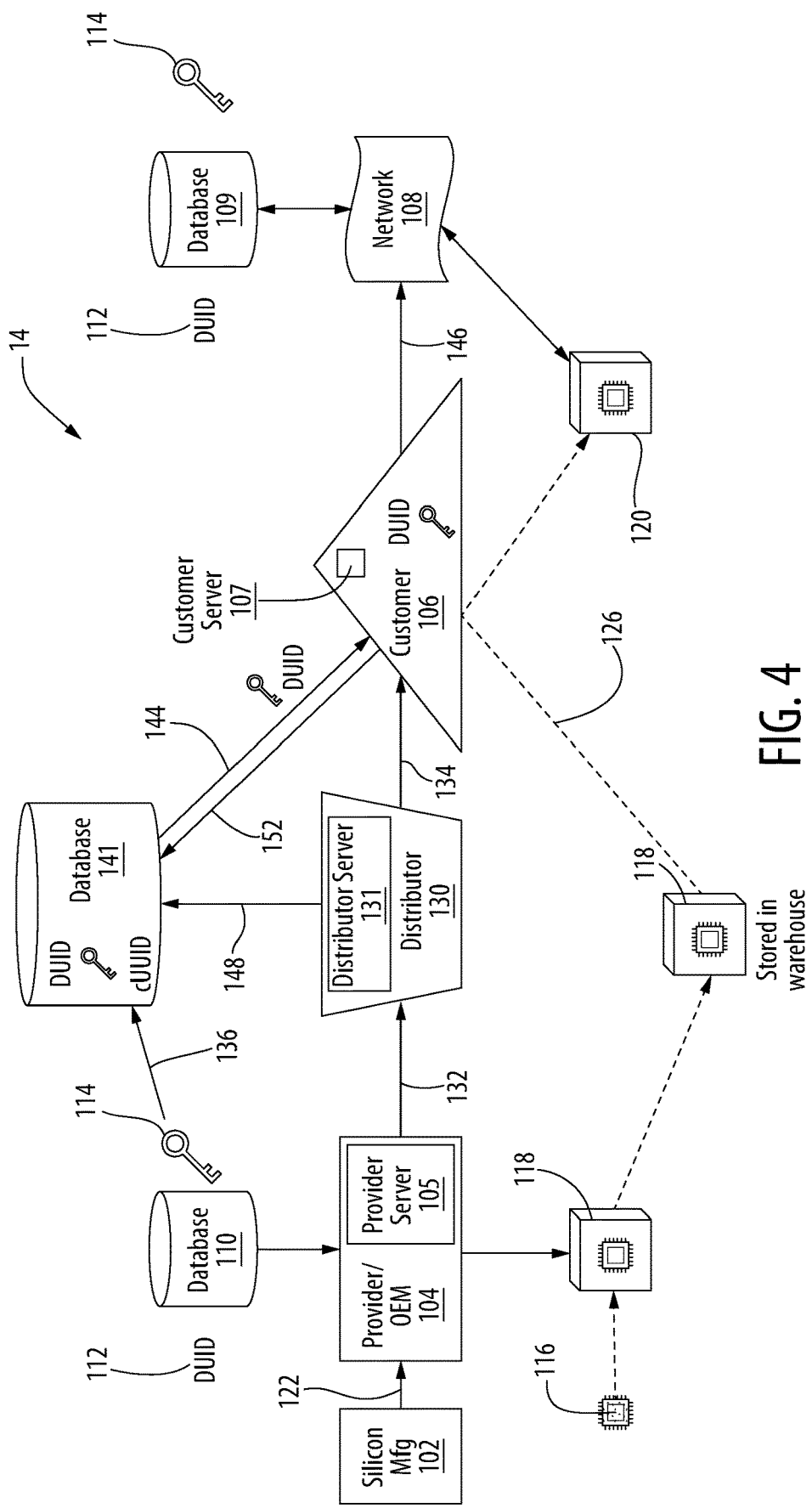
FIG. 4 is a block diagram of a system similar to FIG. 3 where devices are sold through a distributor, but where a cryptographically secure unique claim UUID (cUUID) is used to retrieve the secret key.

Using cUUID (FIG. 4)

FIG. 4 is a block diagram of a system 14 similar to FIG. 3 where devices are sold through a distributor, but where a cryptographically secure unique claim UUID (cUUID) is used to retrieve the secret key, the cUUID corresponding to the relevant unique identifiers for the order. Specifically, the system generates cryptographically secure unique claim UUID (cUUID) (e.g., by accepted methods such as CSPRNG and/or Hash functions). In operation 148, rather that the distributor 130 providing the database 141 with the customer order identifier (as in operation 138), the distributor 130 provides that database 141 with the cUUID. Optional generation of cUUID with salt (from customer) and pepper Hash function may be used to further increase security. In operation 152, unlike operation 142 of FIG. 3, the customer enters the cUUID (or provides salt that generates cUUID). In the exemplified embodiment, the other components and operations remain largely similar to FIG. 3 and therefore are not repeated here.

Figure 5:
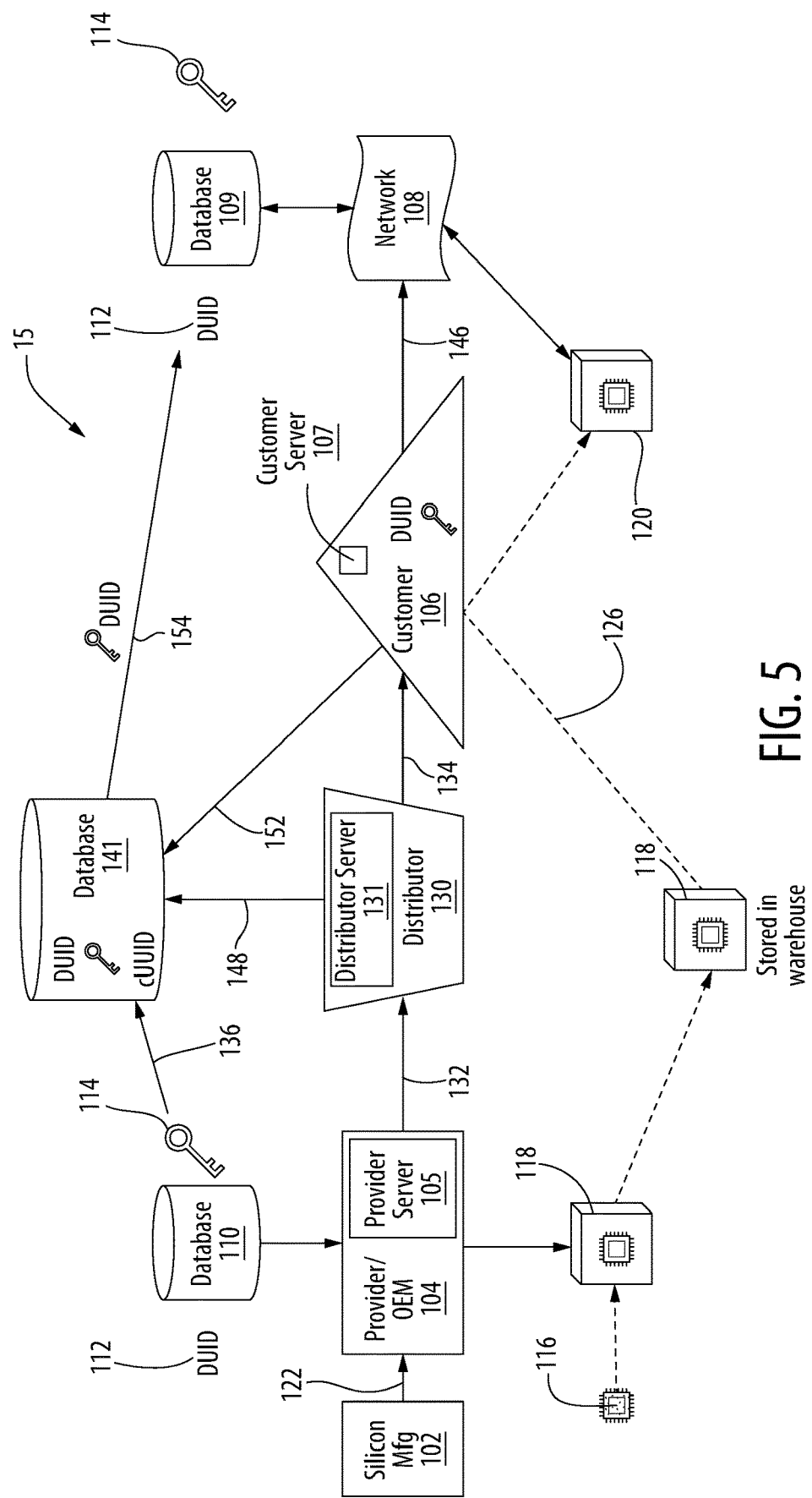
FIG. 5 is a block diagram of another system where devices are sold through a distributor, but where the secret keys are provided from the database to a customer representative network.

Database Provides Keys to Customer Representative Network (FIG. 5)

FIG. 5 is a block diagram of another system 15 where devices are sold through a distributor 130, but where the secret keys are provided from the database 141 to a customer representative network 108. The system is similar to that of FIG. 4, but instead of operation 144 where the database 141 provides the secret keys to the customer 106, in operation 154 the database 141 provides the secret keys to the customer representative network 108. This network 108 may comprise a customer-controlled server or a third party server of a third party distinct from the customer (e.g., from a network as a service (NaaS) provider). For example, the customer could be a retail company that is using a third party company for installing temperature sensors or other hardware devices in the store. The customer could provide the cUUID and, in response, the database 141 can provide the third party's network the secret keys to enable authentication. Multiple integrations may be supported.

This system shows how direct API integration may be supported, with the network 108 further enhancing overall security. The customer 106 may have the electronic system automatically register the secret keys with the network provider the customer chooses. This further enhances the security of the devices and network as the secret key is never exposed by the customer in the process of claiming it from the distributors system and registering it with the customer's network provider. It further reduces the logistical effort needed by the customer to manually claim the secret keys and then register them with the network provider. In the exemplified embodiment, the other operations and their components remain largely similar to FIG. 3 and therefore are not further discussed here.

Figure 6:
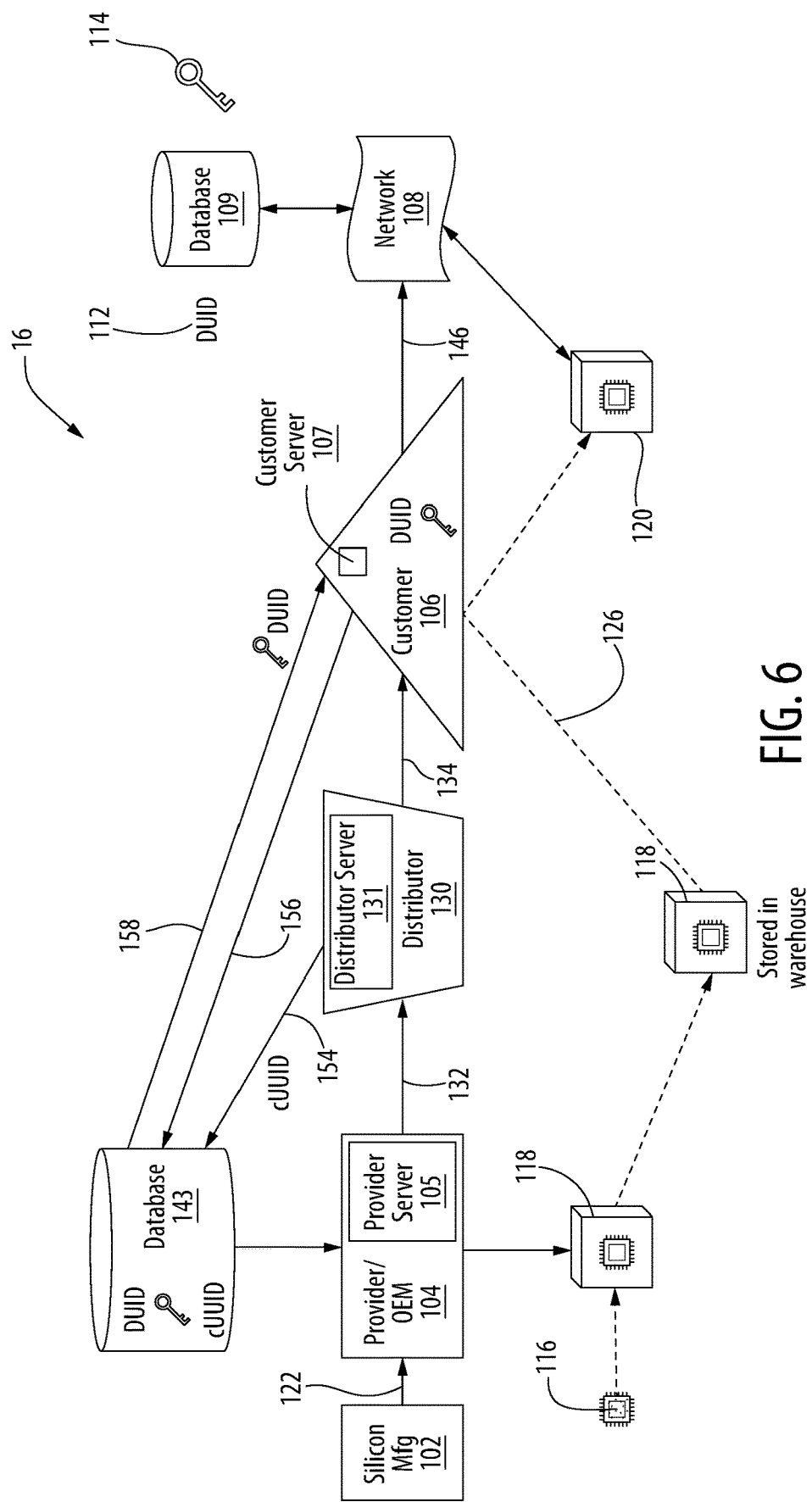
FIG. 6 is a block diagram of another system where devices are sold through a distributor, but where the distributor utilizes the provider's database for storing the unique identifiers and secret keys.

Combining Databases (FIG. 6)

FIG. 6 is a block diagram of another system 16 where devices are sold through a distributor, but where the distributor 130 utilizes the provider's database 143 for storing the unique identifiers and secret keys. The system is similar to that shown in FIG. 4, but instead of using database 141, the distributor utilizes provider database 143 (this provider database 143 being a type of database associated with the distributor). In operation 154 (similar to operation 148), the distributor 130 provides that database 143 with the cUUID. In operation 156 (similar to operation 152), the customer enters the cUUID (or provides salt that generates cUUID). In operation 158 (similar to operation 144), the database 143 provides the customer server 107 the secret keys (e.g., in cleartext, un-encrypted) and the unique identifiers, which are then in operation 146 registered with the network 108.

This embodiment demonstrates how the invention can support direct API integration with a provider/OEM who chooses to keep secret keys in their own provider/OEM server. The distributor provides the critical function of connecting specific devices (DUIDs) to the customers' ID (optionally generating the cUUID). In this embodiment, the end customers purchasing hardware devices from a distributor or reseller can claim the secret keys for the purchased devices directly from the hardware device provider's/OEM's secure database of device-specific secure keys via the distributor providing, for example, a unique claim value (e.g., order number or token) or a unique Hash function derived for each device purchased.

Figure 7:
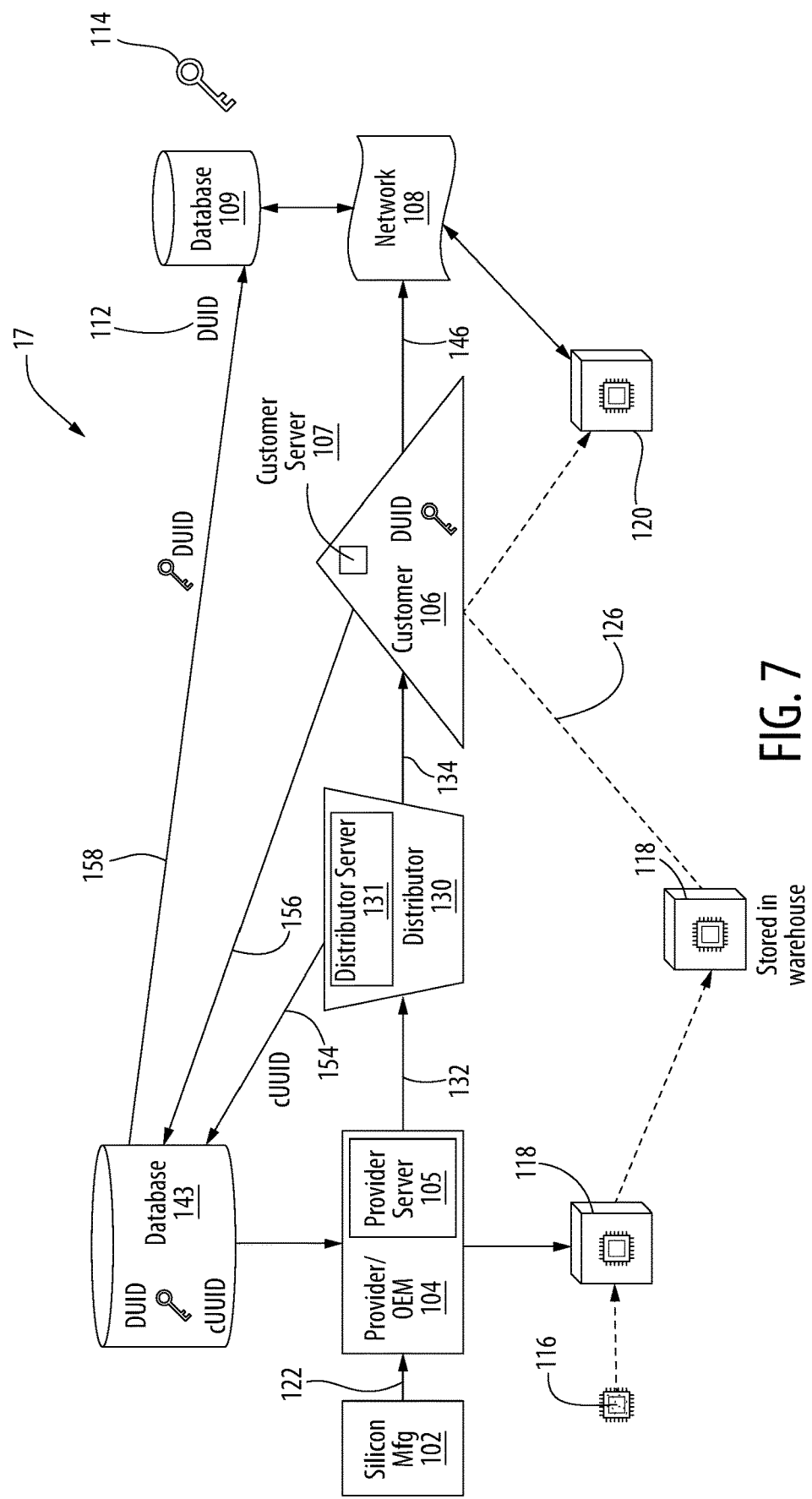
FIG. 7 is a block diagram of a system similar to FIG. 6, but where the secret keys are sent not to the customer, but to a customer representative network that may be a network of a third party.

Providing Keys to Customer Representative Network (e.g., Third Party) (FIG. 7)

FIG. 7 is a block diagram of a system 17 similar to FIG. 6, but where the secret keys are sent not to the customer 106, but to a customer representative network 108 that may be a network of a third party. Thus, the main difference from FIG. 6 is that in operation 158 the database 143 provides the secret keys to the customer representative network 108. In this sense, the exemplified system 17 is similar to that of FIG. 5, and operation 158 is similar to FIG. 5's operation 154. As with FIG. 5, here the network 108 may comprise a customer-controlled server or a third party server of a third party distinct from the customer (e.g., from a network as a service (NaaS) provider). The benefits of providing the keys directly to the network 108 are discussed with respect to FIG. 5 and would also apply here.

Figure 8:
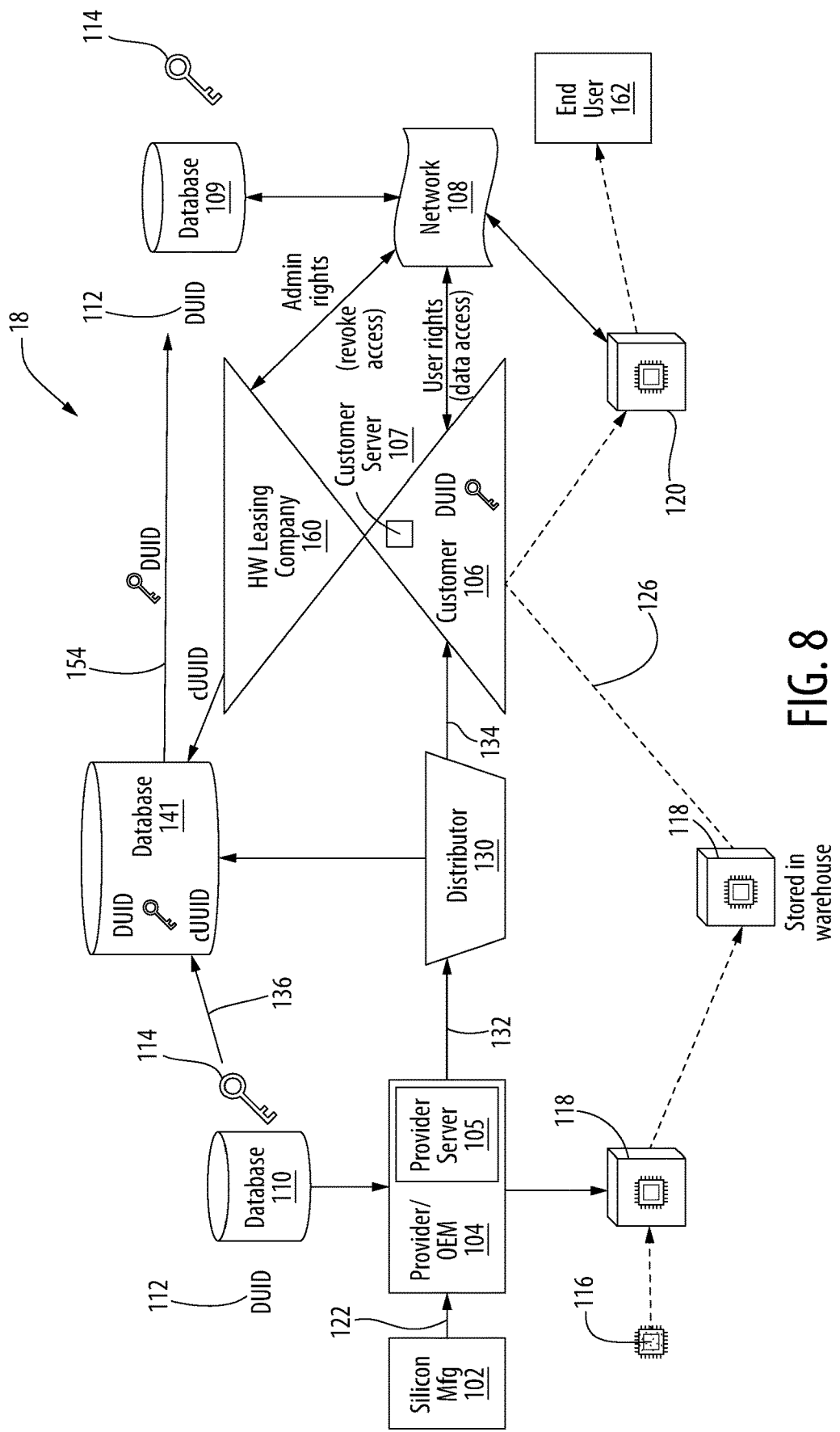
FIG. 8 is a block diagram of another system where devices are sold through a distributor, but where the customer leases the devices to an end user.

Customer Leases Devices to End User (FIG. 8)

FIG. 8 is a block diagram of another system 18 where devices are sold through a distributor 130, but where the customer 106 includes a leasing company 160 that leases the devices to an end user 162. The end user does not receive the secret keys, and the customer has the ability to remotely shut down any one of the ordered portion of the hardware devices. The exemplified system 18 is similar to FIG. 5, but for the customer leasing company 160 and the end user 162.

The exemplified system 18 shows how a lessor of hardware devices can maintain the privacy of the secret keys for the devices while enabling a lessee to register the hardware device with a network root of trust 108 and access the data and functionality of the device for term of the lease. Further, the lessor has the ability to revoke the privileges of the lessee by disabling the access of secret keys to the root of trust network 108, by de-registering the device from the root of trust or by deleting the secret keys from the root of trust. This innovation is critical to the ability of networks based on shared secret key security schemes to maintain integrity by protecting the hardware device secret keys and not exposing them to lessees. Without such a system the lessor would have to provide the hardware device's secret keys to the lessee to enable them to use the device. Once the secret keys are exposed to the first lessee, it permanently compromises the integrity of the device, and potentially the networks they are used on, if the device is re-leased to another lessee in the future. There is no way to guarantee that a prior lessee properly protected the secret keys of the device they lease. The proposed process protects the hardware devices secret keys across multiple lessees.

An alternative approach to the proposed process would be to reprogram the hardware devices with new secret keys after they are reclaimed at the end of a lease. Although possible, this approach is not practical due to the lack of a standard reprogramming interface on hardware devices, costs associated with reprogramming, and the security risk enabling device reprograming (re-keying) inherently exposes.

It is noted that the lessor does not need to buy devices through a distributor or reseller for this model to work. The lessor may buy devices directly from the provider/OEM. The lessor may operate its own secret key database. Alternatively, the distributor/reseller may operate the secret key database as a service.

Figure 9:
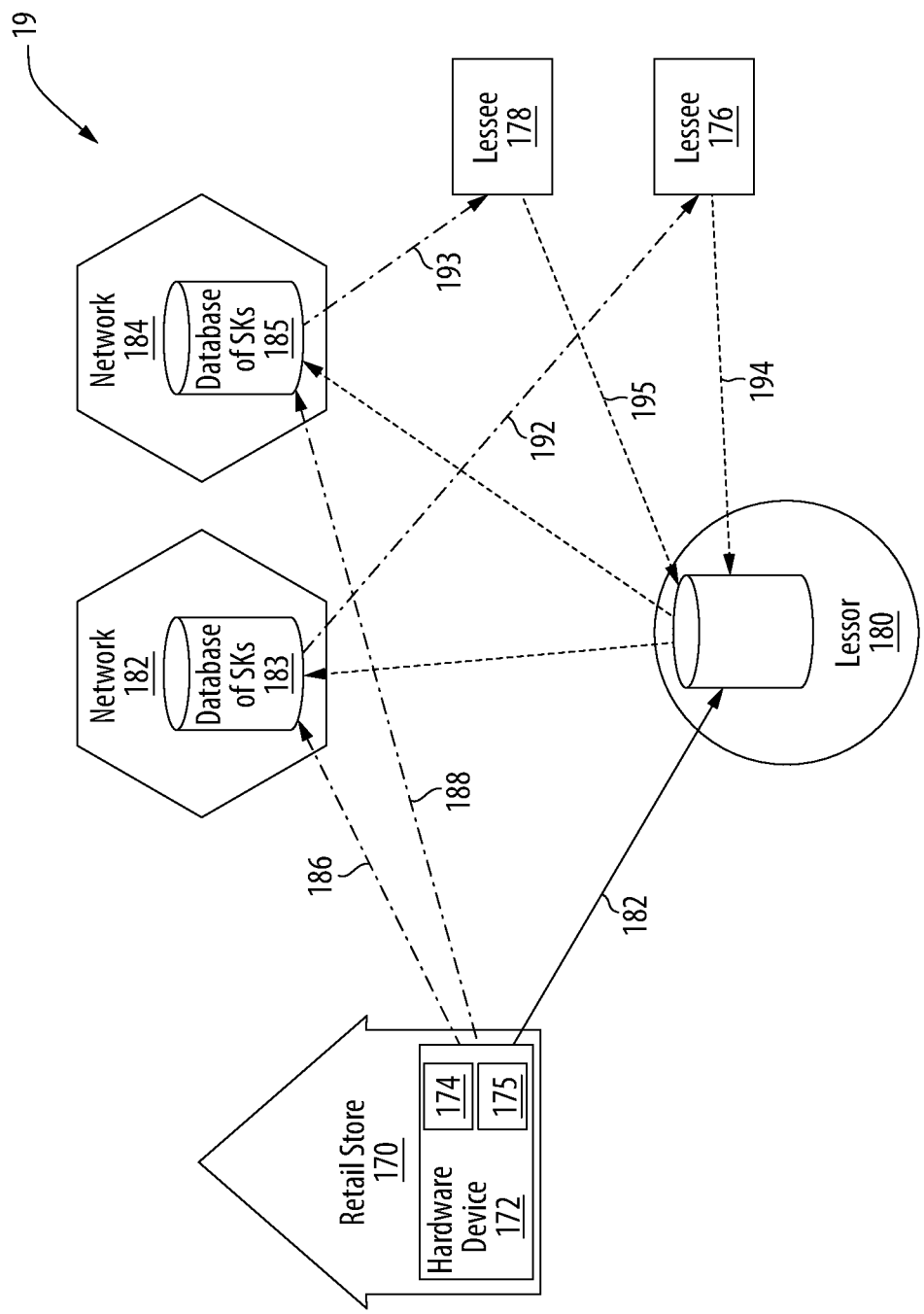
FIG. 9 is a block diagram of a system enabling multiple lessors of a single hardware device.

Multiple Lessees (FIG. 9)

FIG. 9 is a block diagram of a system 19 enabling multiple lessees 176, 178 of a single hardware device 172. In this embodiment, the hardware device 172 is a PIR sensor in a retail store, though the invention is not limited to a particular type or hardware device or location. The sensor 172 has multiple unique secure key sets 174. The sensor 172 is configured to programmatically sequence through its different personalities based on the terms of the lease agreements.

In the exemplified embodiment, the device 172 deliver secret keys to the customer/lessor 180 (operation 182). The device 172 also delivers data to the relevant networks 182, 184 (operations 186, 188), which in turn provide data to the relevant lessees 176, 178 (operations 192, 193). Lessee 176 is assigned the first secret key set 174, and lessee 178 is assigned the second secret key set 175. The lessor 180 provides the databases 183, 185 of the respective networks 182, 184 the secret keys and a control and lease profile for the lessees. In operations 194, 195, the lessees 176, 178 claims the device from the lessor 180.

For example, the PIR sensor 172 may be a motion detector in a commercial retail store and be leased to a company (lessee 176) providing a people counting data analytics service during the hours the store is open. The motion detector 172 may also be leased to a company (lessee 178) providing a security monitoring service during the hours the building is closed.

Alternatively, a temperature sensor in a freezer for food storage could be leased to the HVAC servicing company and to a company using the temperature data for FDA compliance logs. Since each lessee has their own unique key set, the hardware device may be concurrently authenticated on multiple networks corresponding to each lessee's preference.

The temperature sensor could perform two completely independent temperature measurements and data transmissions per specific lease terms that was based on 100% ownership of the sensors resources based on a time division multiplex approach. Alternatively, the lease may provide the lessee shared access to the sensor data and only a unique transmission of the data. For example, a temperature sensor may perform one temperature measurement per hour that is sent via multiple transmissions to each lessee using their unique secret key sets and sending data to each lessees preferred network.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A method for secure distribution of secret keys for hardware devices, the method comprising:
    a) a distributor server of a distributor transmitting to a provider server of a provider an order for hardware devices, wherein the provider is separate and distinct from the distributor, wherein the hardware devices have unique identifiers, and wherein each respective hardware device has (i) a corresponding unique identifier of the unique identifiers and (ii) at least one secret key enabling authentication of the respective hardware device;
    b) receiving from the provider server at a database associated with the distributor the unique identifiers and unencrypted keys, wherein for each of the respective hardware devices, the database receives the corresponding unique identifier and an unencrypted key of the unencrypted keys, the unencrypted key being an unencrypted version of the at least one secret key for the respective hardware device, and wherein the distributor does not have general access to the unencrypted keys;
    c) in response to an order received by the distributor from a customer for a portion of the hardware devices:
        i) the distributor server providing the database (1) the unique identifiers corresponding to the hardware devices of the ordered portion, and (2) an associated customer order identifier for the order; and
        ii) the distributor server providing a customer server the unique identifiers corresponding to the hardware devices of the ordered portion;
    d) in response to a representative of the customer logging into the database from a customer representative network and providing, via a user interface, order information for the ordered portion of the hardware devices, the database providing the customer server or the customer representative network the unencrypted keys for the hardware devices of the ordered portion; and
    e) authenticating the hardware devices of the ordered portion using the unencrypted keys for the hardware devices of the ordered portion.

2. The method of claim 1 wherein, in step d), the database provides the customer server the unencrypted keys for the hardware devices of the ordered portion, which are subsequently provided to the customer representative network.

3. The method of claim 1 wherein, in step d), the database provides the customer representative network the unencrypted keys for the hardware device of the ordered portion.

4. The method of claim 1 wherein the order information is at least one of:
    each unique identifier for the hardware devices of the ordered portion;
    the customer order identifier; or
    a cryptographically secure unique claim UUID (cUUID).

5. The method of claim 4 wherein the customer order identifier is a customer order number or a Hash function.

6. The method of claim 1 wherein the customer representative network is a network of a third party separate and distinct from the customer.

7. The method of claim 1 wherein steps a) to d) are carried out for each of multiple distinct distributors each transmitting distinct orders to the provider.

8. The method of claim 1 wherein the customer leases the ordered portion of the hardware devices to an end user that does not receive the unencrypted keys, the customer having the ability to remotely shut down any one of the ordered portion of the hardware devices.

9. The method of claim 1 wherein only one user associated with the distributor has administrative access to the database to access the unencrypted keys for the hardware devices.

10. The method of claim 1 wherein at least one of the distributor server, the provider server, or the customer server comprises multiple processors.

11. The method of claim 1 wherein the database associated with the distributor is a database operated by the provider.

12. A system for secure distribution of secret keys for hardware devices, the system comprising:
    a provider server of a provider;
    a distributor server of a distributor, the distributor server configured to transmit to the provider server an order for hardware devices,
        wherein the provider is separate and distinct from the distributor, wherein the hardware devices have unique identifiers, and wherein each respective hardware device has (i) a corresponding unique identifier of the unique identifiers and (ii) at least one secret key enabling authentication of the respective hardware device; and
    a database associated with the distributor, the database configured to receive from the provider server the unique identifiers and unencrypted keys, wherein for each of the respective hardware devices, the database receives the corresponding unique identifier and an unencrypted key of the unencrypted keys, the unencrypted key being an unencrypted version of the at least one secret key for the respective hardware device, and wherein the distributor does not have general access to the unencrypted keys;

wherein the distributor server is further configured to, in response to an order received by the distributor from a customer for a portion of the hardware devices:

provide the database (1) the unique identifiers corresponding to the hardware devices that of the ordered portion, and (2) an associated customer order identifier for the order; and provide a customer server the unique identifiers corresponding to the hardware devices of the ordered portion;

wherein in response to a representative of the customer logging into the database from a customer representative network and providing, via a user interface, order information for the ordered portion of the hardware devices, the database is configured to provide the customer server or the customer representative network the unencrypted keys for the hardware devices of the ordered portion; and wherein the customer representative network is configured to authenticate the hardware devices of the ordered portion using the unencrypted keys for the hardware devices.

13. The system of claim 12 wherein the database is configured to provide the customer server the unencrypted keys for the hardware devices of the ordered portion, and the customer server is configured to subsequently provide the at least one secret key for each of the hardware devices of the ordered portion to the customer representative network.

14. The system of claim 12 wherein the database provides the customer representative network the unencrypted keys for the hardware device of the ordered portion.

15. The system of claim 12 wherein the order information is at least one of:

each unique identifier for the hardware devices of the ordered portion;

the customer order identifier; or a Hash function.

16. The system of claim 15 wherein the customer order identifier is a customer order number or a Hash function.

17. The system of claim 12 wherein the customer representative network is a network of a third party separate and distinct from the customer.

18. The system of claim 12 wherein the distributor forms part of a plurality of distinct distributors, each having its one server for transmitting distinct orders to the provider server.

19. The system of claim 12 wherein the customer leases the ordered portion of the hardware devices to an end user that does not receive the unencrypted keys, the customer having the ability to remotely shut down any one of the ordered portion of the hardware devices.

20. A method for secure distribution of secret keys for hardware devices, the method comprising:

a) a distributor server of a distributor transmitting to a provider server of a provider an order for hardware devices, wherein the provider is separate and distinct from the distributor, wherein the hardware devices have unique identifiers, and wherein each respective hardware device has (i) a corresponding unique identifier of the unique identifiers and (ii) at least one secret key enabling authentication of the respective hardware device;

b) receiving from the provider server at a database associated with the distributor, the unique identifiers and unencrypted keys, wherein for each of the respective hardware devices, the database receives the corresponding unique identifier and an unencrypted key of the unencrypted keys, the unencrypted key being an unencrypted version of the at least one secret key for the respective hardware device, and wherein the distributor does not have not having general access to the unencrypted keys;

c) in response to an order received by the distributor from a customer for a portion of the hardware devices:

i) the distributor server providing the database (1) the unique identifiers corresponding to the hardware devices of the ordered portion, and (2) an associated customer order identifier for the order; and ii) the distributor server providing a customer server the unique identifiers corresponding to the hardware devices of the ordered portion; and d) in response to a representative of the customer logging into the database from a customer representative network and providing, via a user interface, order information for the ordered portion of the hardware devices, the database providing the customer server or the customer representative network the unencrypted keys for the hardware devices of the ordered portion to enable the customer representative network to authenticate the hardware devices of the ordered portion.

* * * * *